United States Patent [19]
Williams

[11] Patent Number: 5,156,383
[45] Date of Patent: Oct. 20, 1992

[54] WINDOW POLISHING STAND

[76] Inventor: Ronnie G. Williams, 1015 S. Bleckly St., Apartment 306, Wichita, Kans. 67208

[21] Appl. No.: 732,925

[22] Filed: Jul. 19, 1991

[51] Int. Cl.⁵ .............................................. B23Q 3/00
[52] U.S. Cl. .................................. 269/293; 269/285; 269/286
[58] Field of Search ................... 269/289 R, 292, 293, 269/306, 900, 285, 286, 290, 291

[56] References Cited

U.S. PATENT DOCUMENTS

| | | | |
|---|---|---|---|
| 1,000,725 | 8/1911 | Duus. | |
| 1,159,830 | 11/1915 | Clark | 269/293 |
| 1,283,795 | 11/1918 | Kelley. | |
| 2,144,849 | 1/1939 | Moore | 101/407 |
| 2,535,581 | 12/1950 | Klingman | 269/291 |
| 2,743,435 | 4/1956 | Wayne | 340/367 |
| 3,015,692 | 1/1962 | Herrington | 178/7.8 |
| 3,056,600 | 10/1962 | Merrick | 269/32 |
| 4,254,946 | 3/1981 | Kerr et al. | 269/285 |

Primary Examiner—J. J. Swann
Attorney, Agent, or Firm—Laney, Dougherty, Hessin & Beavers

[57] ABSTRACT

A window polishing stand for securely receiving and holding selected ones of a class of aircraft window panels during a polishing operation. The stand consists of a planar panel member having a generally oval hole cut centrally therein and having at least three short legs supporting about the periphery to allow clearance beneath the panel member. A quadrature array of felt pads are then included around the edge of the oval hole for padding purposes and clamping assemblies are provided on opposite sides in line with the minor axis of the oval hole thereby to provide secure positioning of the aircraft window with either the concave or convex side directed downward.

4 Claims, 2 Drawing Sheets

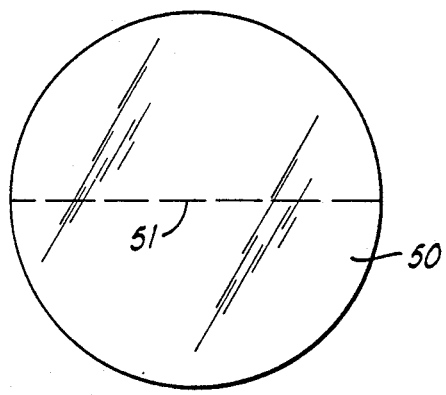
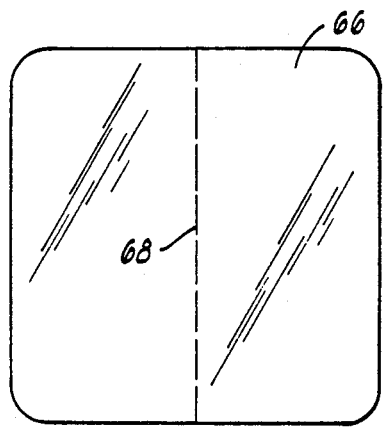
FIG. 3A    FIG. 3E
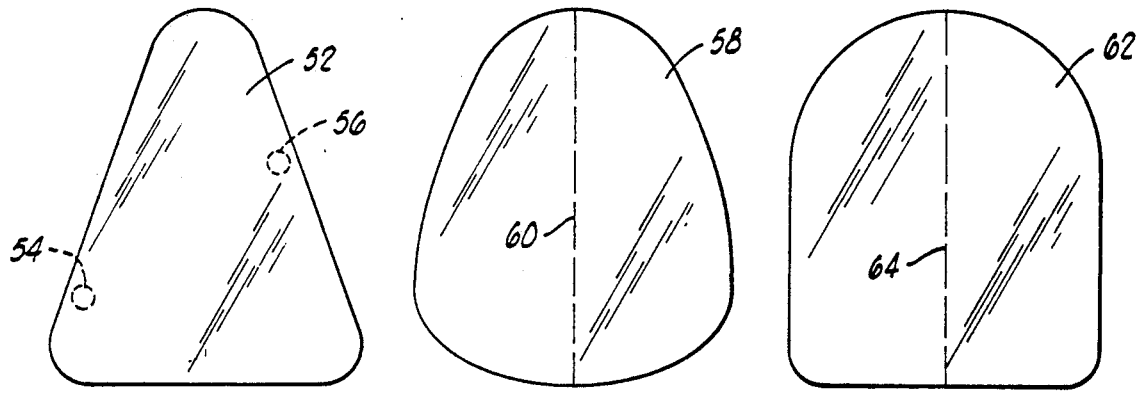
FIG. 3B    FIG. 3C    FIG. 3D
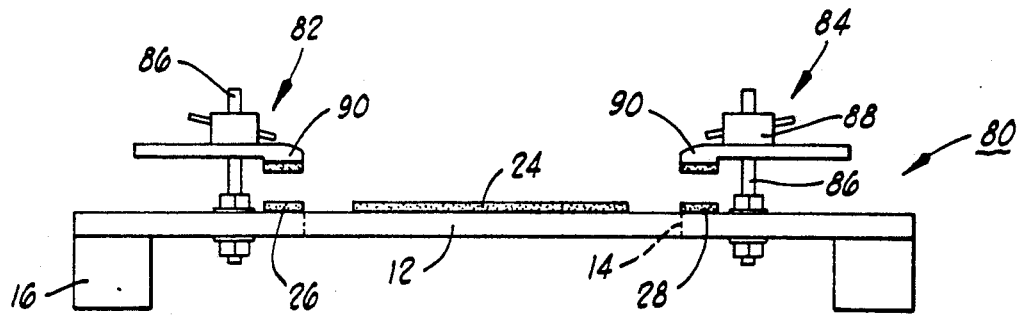
FIG. 5

WINDOW POLISHING STAND

BACKGROUND OF THE INVENTION

1. Field of the Invention

The invention relates generally to stabilizing jigs adapted to retain standard-sized window panels during a polishing process, and more particularly, but not by way of limitation, it relates to an improved polishing stand for receiving selected ones of a plurality of standardized types of aircraft window so that the polishing process can be carried out not only faster but more thoroughly.

2. Description of the Prior Art

Pre-examination search discloses a number of different types and shapes of jig structure for varying use in stabilizing an article. Various types of picture frame jig are known and these types of device are directed to means for positively holding or blocking opposed corners of a frame assembly while certain other work operation takes place. U.S. Pat. No. 2,144,849 discloses a device for holding a glass panel in positive manner while certain configurations are printed thereon. Still other jig retaining structures for use in diverse applications have been developed in the prior art, but no structure similar to the present invention was found.

SUMMARY OF THE INVENTION

The present invention relates to a window polishing jig that is designed for use with a plurality of standard-sized commercial window panels in carrying out the final finishing and polishing process. The invention consists of a leg supported planar member having a generally oval hole cut out of the middle with suitable padding and clamping structure secured therearound. The oval hole is adapted to receive convex surfaces of any of the standard aircraft windows such as round, square, triangular, tear drop and D windows. Opposite side clamping members are spaced for easy securing of any one of the standard windows for the polishing operation.

Therefore, it is an object of the present invention to provide a window polishing stand that enables a faster polishing operation;

It is also an object of the present invention to provide such a polishing stand that can receive any selected one of a number of standard window panels;

It is yet further an object of the invention to provide a window finishing stand that is relatively compact and has few moving parts;

Finally, it is an object of the present invention to provide an aircraft window jig that improves the polishing operation while reducing the required time.

Other objects and advantages of the invention will be evident from the following detailed description when read in conjunction with the accompanying drawings which illustrate the invention.

BRIEF DESCRIPTION OF THE DRAWINGS

FIG. 3A is a plan view of a round type aircraft window;

FIG. 3B is a plan view of a triangular type aircraft window;

FIG. 3C is a plan view of a tear drop type of aircraft window;

FIG. 3D is a plan view of a D-type aircraft window;

FIG. 3E is a plan view of a square aircraft window;

FIG. 5 is a side view in elevation of yet another alternative form of stabilizer stand and securing structure.

DETAILED DESCRIPTION OF THE INVENTION

Figure 1:
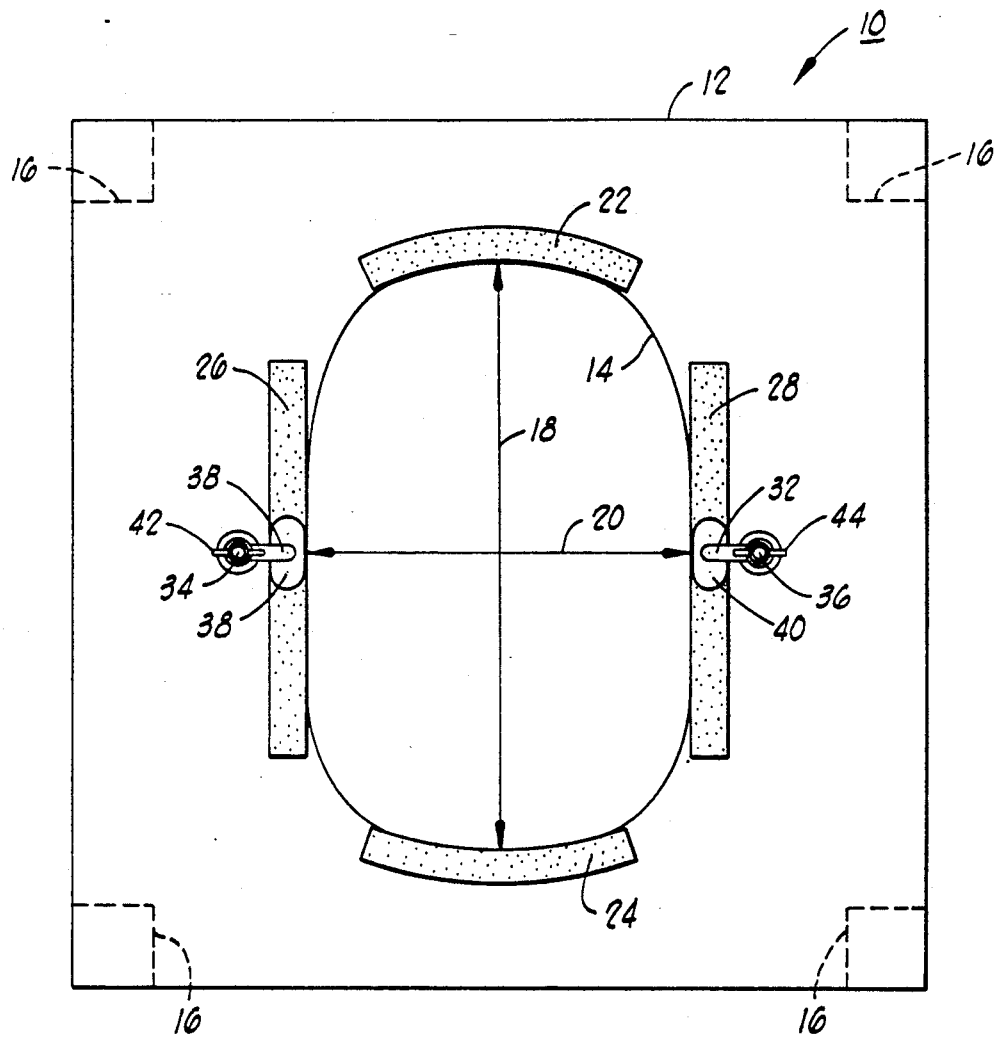
FIG. 1 is a top plan view of the window stabilizing stand.
Figure 2:
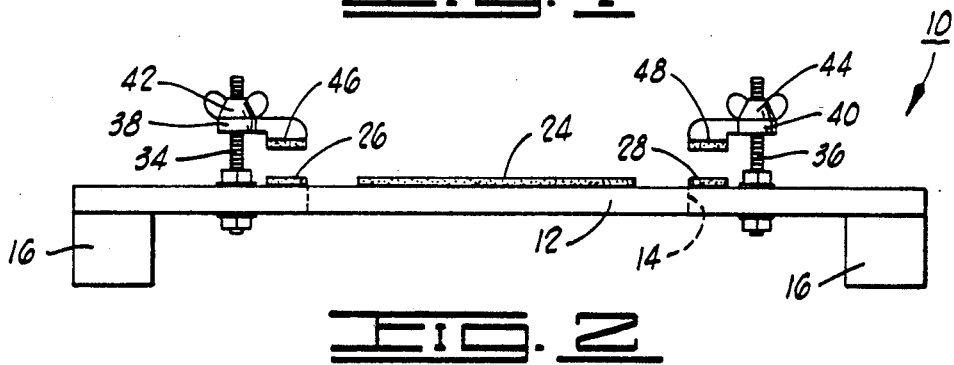
FIG. 2 is a side view in elevation of the stabilizing stand.

Referring to FIGS. 1 and 2, a polishing stand 10 consists of a panel 12 having an oval hole 14 formed centrally thereof. The panel 12 may be formed from such as one inch thick polycast glass, and a plurality of corner legs 16, wooden blocks or such, may be suitably bonded thereon. The corner legs 16 need only be about three inches in height, i.e. sufficient to maintain a desirable clearance beneath the panel 12. In present design, the work panel 12 is two feet by two feet square, this being sufficient size to enable ample work space.

The oval hole 14 is formed in a generally oval shape so that it most exactly accommodates each of the standard-sized aircraft windows, as shown in FIGS. 3A through 3E. The aircraft windows of FIGS. 3A through 3E are types which are found in most commercial aircraft. Referring again to FIG. 1, the oval hole 14 has a major axis 18 of 17.75 inches and a minor axis 20 of 14.50 inches. Upper and lower arcuate pads 22 and 24, formed from ⅛ inch felt or similar material, are bonded securely around the upper and lower confines of oval hole 14 for cushioning purposes. In like manner, opposite side pads 26 and 28, also formed of suitable felt material, are bonded along opposite sides of oval hole 14 in juxtaposition.

Suitable clamp assemblies 30 and 32 are located on each side of oval hole 14 adjacent pads 26 and 28, respectively, for the purpose of securing the particular window assembly in position over oval hole 14 during the finishing and/or polishing operation. Any suitable quick-release clamping assemblies may be utilized. In FIGS. 1 and 2, there is shown bolt fixtures 34 and 36 secured through panel 12 and receiving respective clamp arms 38 and 40 as tightened by wing nuts 42 and 44, respectively. Suitable cushioning pads 46 and 48 are secured on the bite surface of clamp arms 38 and 40 to prevent marring or scratching of the window surface.

In operation, any of the windows in FIGS. 3A through 3E and other generally similar configurations can be used in the polishing stand 10. All of the windows are of arcuate expanse with the convex surface opening outward relative to the aircraft. Thus, the oval hole 14 provides space through which the convex arcuate expanse can extend during the polishing operation. FIG. 3A is a circular window 50 and it need only be positioned with the diameter 51 overlaying the minor axis 20 and clamp assemblies 30 and 32 secured on opposite edges. The polishing operation can then proceed first on one side and then, with reversal of the panel, the other side may be polished. FIG. 3B is a triangular window 52 and it is accommodated by tilting the window panel relative to oval hole 14. That is, window panel 52 is placed over the oval hole 14 and then turned, e.g., clockwise so that areas 54 and 56 (FIG. 3B) fall under the respective clamping assemblies 30 and 32.

FIG. 3C illustrates a tear drop window 58 which is another popular design. One need only align the major up/down dimension 60 with the major axis 18 of oval hole 14 whereupon the clamping assemblies 30 and 32 can be operated to secure the tear drop window 58.

FIG. 3D illustrates a D-type window 62 which may also be installed by aligning the major vertical dimension 64 with the major axis 18 of oval hole 14 for subsequent clamping. In like manner, the square window 66, as shown in FIG. 3E, may also be positioned with alignment of vertical center line 68 and the major axis 18 of oval hole 14.

With any of the window types, the window may be clamped with convex surface downward into oval hole 14 and secured in place while the polishing operation proceeds. Upon completion of the first or concave side of the window panel, it is merely required that the window be turned over and re-clamped for polishing of the other side (the convex surface) It has been found that use of the stabilizing window stand 10 enables a more thorough and uniform polishing in less time.

Figure 4:
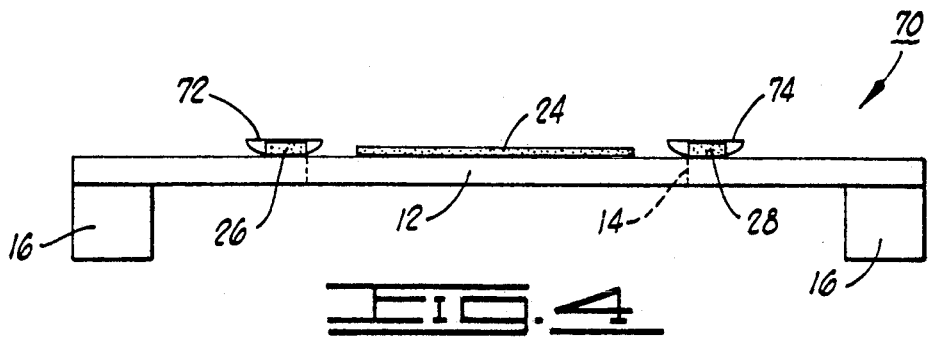
FIG. 4 is a side view in elevation of an alternative form of stabilizer stand and securing arrangement.

FIG. 4 illustrates an alternative polishing stand 70 wherein the only difference is the use of suction cups 72 and 74 as secured about half way along opposite side pads 26 and 28 or in-line with the minor axis 20. It is contemplated that the suction cups 72 and 74 will offer secure positioning of the window panel during the work process while also enabling an extremely quick-release securing arrangement.

Yet another quick-release form of clamping assembly is utilized in the FIG. 5 polishing stand 80. A pair of ratchet clamps 82 and 84 are identical and consist of a vertical post 86 with a ratchet block 88 riding therealong. A spring arm 90 controls positioning of ratchet block 88 along the post 86, and a clamping arm 90 secured to block 88 may be rapidly positioned in clamping engagement with a selected window panel.

The foregoing discloses a novel form of polishing stand that is adapted to receive a particular class of window panels, e.g., those window panels utilized in most commercial aviation construction. The polishing stand is of simple yet reliable construction and enables window polishing processes to be carried out more effectively with greater speed Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A stabilizing stand for use in combination with selected aircraft windows, comprising:
   a planar member having a periphery and including at least three leg supports connected to the periphery to enable support of the planar member in generally horizontal attitude;
   a generally oval hole formed through said planar member, said hole having predetermined longer and shorter orthogonal dimensions;
   first and second elongated pads each secured adjacent opposite sides of said oval hole as aligned parallel to the longer orthogonal dimension;
   third and fourth elongated pads each secured adjacent opposite sides of said oval hole as aligned parallel to the shorter orthogonal dimension;
   a standard aircraft window positioned over said oval hole; and
   first and second securing means disposed centrally adjacent said first and second elongated pads to secure the aircraft window over said oval hole for a polishing operation;
   whereby any of several standard window configurations can be clamped in cushioned security on said stabilizing stand.

2. A stabilizing stand as set forth in claim 1 wherein:
   said standard aircraft windows are identified as round, square, triangle, tear drop and D-shape types that can be clamped on said stabilizing stand.

3. A stabilizing stand as set forth in claim 2 wherein:
   said longer and shorter dimensions are 17.75 inches and 14.5 inches, respectively.

4. A stabilizing stand as set forth in claim 1 wherein:
   said elongated pads are heavy felt material.

* * * * *